(12) United States Patent
Breunig

(10) Patent No.: US 6,178,375 B1
(45) Date of Patent: Jan. 23, 2001

(54) METHOD AND DEVICE FOR DETERMINING THE INERTIAL POSITION OF A VEHICLE

(75) Inventor: Volker Breunig, Heilbronn-Neckargartach (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/308,473

(22) PCT Filed: Sep. 15, 1998

(86) PCT No.: PCT/DE98/02728

§ 371 Date: May 17, 1999

§ 102(e) Date: May 17, 1999

(87) PCT Pub. No.: WO99/17964

PCT Pub. Date: Apr. 15, 1999

(30) Foreign Application Priority Data

Oct. 6, 1997 (DE) ............................................. 197 44 085

(51) Int. Cl.[7] .................................................. B60R 21/32
(52) U.S. Cl. ........................ 701/124; 701/72; 701/79; 280/5.507; 73/178 R
(58) Field of Search ..................................... 701/207, 103, 701/37, 220, 221, 124, 72, 79; 280/5.507; 73/178 R

(56) References Cited

U.S. PATENT DOCUMENTS 5,797,111 * 9/1998 Halasz et al. ........................ 701/103

* cited by examiner

Primary Examiner—William A. Cuchlinski, Jr.
Assistant Examiner—Arthur D. Donnelly
(74) Attorney, Agent, or Firm—Michael J. Striker

(57) ABSTRACT

The method of determining respective rotational position angles ($\alpha x, \alpha y, \alpha z$) of a vehicle includes measuring respective accelerations ($ax, ay, az$) of the vehicle (FZ) in the x, y and z directions; calculating first position angle values ($\phi x1, \phi x2$) and second position angle values ($\phi y1, \phi y2$) from the measured accelerations according to equations (1) and (2):

$$\phi x1 = \arcsin\{ay/g\} \quad \phi y1 = \arcsin\{ax/g\} \quad (1)$$

$$\phi x2 = \arccos\{az/g\} \quad \phi y2 = \arccos\{az/g\} \quad (2)$$

wherein g is the acceleration of gravity; determining respective inertial position angles ($\phi x, \phi y$) as the smaller of the first position angle values ($\phi x1, \phi x2$) and of the second position angle values ($\phi y1, \phi y2$); measuring corresponding rotation rates ($\omega x, \omega y, \omega z$) of the vehicle and determining the respective rotational position angles ($\alpha x, \alpha y, \alpha z$) by integration of corresponding rotation rates with the respective inertial position angles ($\phi x, \phi y$) as initial values.

4 Claims, 1 Drawing Sheet

METHOD AND DEVICE FOR DETERMINING THE INERTIAL POSITION OF A VEHICLE

BACKGROUND OF THE INVENTION

1. Field of the Invention

The present invention relates to a method and an arrangement for determining inertial position angles of a vehicle from measured accelerations and to a method and arrangement for determining rotation angles of the vehicle from the inertial position angles and measured rotation rates.

2. Prior Art

In German Patent Application 196 09 717.1, which was not published by the filing date of the present application, an arrangement for detecting rollover events in vehicles is described. If a vehicle turns over, protection devices installed in the vehicle must be tripped in time; these include for instance roller bars, belt tighteners, and various air bags. If all these protective devices are to be tripped in time, a detection must be made as early as possible whether rotations of the vehicle about its vertical axis, longitudinal axis and transverse axis will cause it to overturn. Mistakes in deciding about a rollover event must be precluded as much as possible so that the restraint devices will not be tripped for instance if the vehicle is parked on a steep slope or is experiencing slow rotational events on cornering. To prevent mistaken decisions in sensing rollover, the inertial position, that is, the outset position of the vehicle relative to the ground-based coordinate system, must be known. The rollover sensing must detect whether rotary motions of the vehicle out of this inertial position are so great that the vehicle will overturn. To prevent mistakes in rollover sensing, it is therefore important to determine the inertial position of the vehicle as exactly as possible. Slow dynamic vehicle motions, such as running up onto a berm, taking a sharp corner, and braking or acceleration events should therefore not affect the ascertainment of the inertial positional angle of the vehicle.

SUMMARY OF THE INVENTION

It is therefore an object of the present invention to provide a method and an arrangement of the type defined at the outset in which disruptive influences in determining the inertial position of the vehicle are precluded as much as possible.

According to the invention the accelerations of the vehicle are measured in the direction of its vertical axis and in the direction of its transverse axis and/or its longitudinal axis, and the inertial position angle of the vehicle with respect to its longitudinal axis and/or the inertial position angle with respect to its transverse axis is ascertained both on the basis of the acceleration in the direction of the transverse axis or longitudinal axis and on the basis of the acceleration in the direction of the vertical axis. Of the two inertial position angles, ascertained in different ways, the smaller is assumed to be the inertial positional angle. A dynamic change in position of the vehicle will as a rule have an effect only on the positional angle ascertained by one of the two algorithms, so that the other positional angle will be highly likely to represent the true inertial position of the vehicle. The two algorithms for ascertaining the positional angle thus offer redundance in the event that one acceleration sensor should be defective.

In rollover events, as a rule very fast changes in position of the vehicle occur, which can be best detected from rotation rate measurements. From the rotation rates measured, the positional angles are then derived by integration, and on the basis of these positional angles it is decided whether the vehicle is about to overturn. To assure that in the integration of the measured rotation rates, slow dynamic vehicle motions, which are not critical in a rollover event, will not be taken into account and thus the positional angles derived will not cause a mistake about a rollover event, it is expedient that the integration of the rotation rates be started with the ascertained inertial position angle or angles.

BRIEF DESCRIPTION OF THE DRAWING

The invention will now be described in further detail in terms of an exemplary embodiment shown in the drawing, in which.

DETAILED DESCRIPTION OF THE INVENTION

Figure 1:
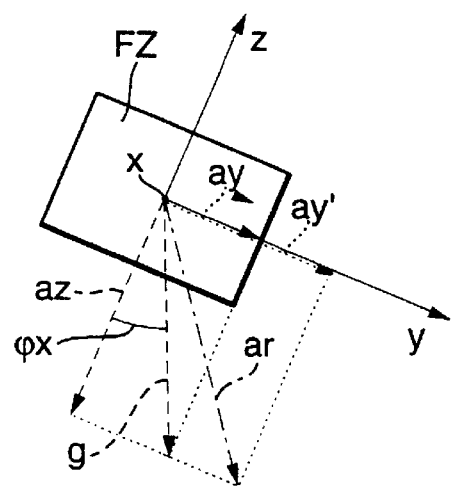
FIG. 1 shows acceleration components of a vehicle with respect to its transverse axis and its vertical axis.
Figure 2:
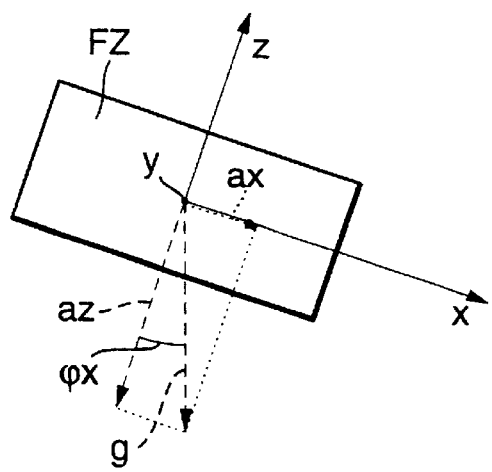
FIG. 2 shows acceleration components of a vehicle with respect to its longitudinal axis and its vertical axis.

In FIG. 1, a vehicle FZ is symbolically shown from the front, and in FIG. 2, the same vehicle FZ is shown from its long side. The coordinate system plotted in FIGS. 1 and 2 defines the vertical axis z, longitudinal axis x and transverse axis y of the vehicle. If the vehicle is stopped or is moving only very slowly, then only the acceleration due to gravity g acts on the vehicle FZ. If the accelerations in the direction of its vertical axis z, longitudinal axis x and transverse axis y are measured in the vehicle, then these individual measured accelerations are components of the gravitational acceleration vector g. If as shown in FIG. 1 the vehicle FZ is tilted relative to its longitudinal axis x, the result of the gravitational acceleration vector g is an acceleration component az in the direction of the vertical axis z and an acceleration component ay in the direction of the transverse axis y. In the event of an inclination of the vehicle FZ about its transverse axis y as shown in FIG. 2, the result of the gravitational acceleration vector g is an acceleration component az in the direction of the vertical axis z and an acceleration component ax in the direction of the longitudinal axis x of the vehicle.

The inertial position of the vehicle FZ orients itself with the acceleration vector g, whose amount and direction are fixed. The angle of inclination φy of the vehicle about its longitudinal axis x, referred to the gravitational acceleration vector g, and the angle of inclination φx of the vehicle about its transverse axis y, referred to the gravitational acceleration vector g, are called the inertial position angles. If only the gravitational acceleration vector g is acting on the vehicle FZ, then the inertial position angles φx and φy can be determined without error, as will be demonstrated below, from the measured acceleration components az, ax, ay. Then, however, only the acceleration due to gravity g acts on the vehicle FZ when the vehicle is either stopped or moving at a constant speed.

Figure 3:
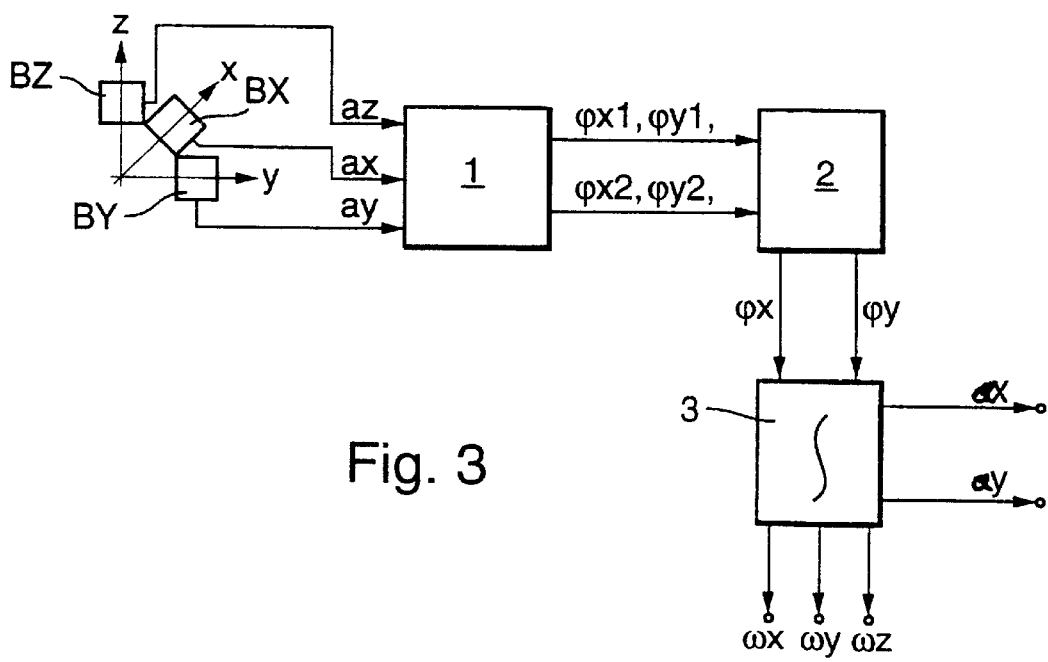
FIG. 3 shows a function diagram for ascertaining the inertial position angle of a vehicle.

In a dynamic vehicle motion, such as on cornering or during braking or acceleration, the vehicle FZ experiences additional acceleration components in the direction of its three axes. It is indicated in FIG. 1 that the vehicle experiences an additional acceleration component ay' in the direction of its transverse axis y when the vehicle is traveling around a corner on the inclined plane and thus experiences a centrifugal acceleration. The vector ar resulting from the measured acceleration components az and ay+ay' now deviates from the gravitational acceleration vector g. An inertial position angle calculated from the acceleration components az and ay+ay' would thus no longer reflect the correct inertial position referred to the gravitational acceleration vector g. It will be explained below in conjunction with FIG. 3 how in such a case, inertial position angles that virtually without error describe the actual inertial position of the vehicle can nevertheless still be ascertained.

Acceleration sensors BX, BY and BZ in the vehicle measure the accelerations ax, ay and az in the direction of the longitudinal axis x, transverse axis y and vertical axis z of the vehicle. In function block 1, the positionacl angles ϕx1 and ϕx2 and/or the positional angles ϕy1 and ϕy2 are calculated from the individual acceleration components ax, ay and az in accordance with the following equations (1) and (2).

$$\varphi x1 = \arcsin\left(\frac{ay}{g}\right), \varphi y1 = \arcsin\left(\frac{ax}{g}\right) \quad (1)$$

$$\varphi x2 = \arccos\left(\frac{az}{g}\right), \varphi y2 = \arccos\left(\frac{az}{g}\right) \quad (2)$$

If a dynamic vehicle motion now gives rise to an additional acceleration component in the direction of the longitudinal axis x or transverse axis y besides the acceleration resulting from the acceleration due to gravity g, then the ascertained positional angle ϕx1 or ϕy1 is greater than the actual positional angle, namely the inertial position angle of the vehicle.

The acceleration az in the direction of the vertical axis z of the vehicle, which can be ascribed to the acceleration due to gravity g, can also have an additional acceleration component superimposed on it that results for instance if the vehicle hits a pothole. In that case, the positional angle ϕx2 or ϕy2 calculated by equation (2) would be greater than the actual inertial position angle. To make it possible despite these problems to ascertain a positional angle ϕx or ϕy that reflects the actual inertial position of the vehicle with the least possible error, the lesser of the two calculated positional angles ϕx1 and ϕy2, or the positional angles ϕy1 and ϕy2, is selected in function block 2, and this lesser positional angle is adopted as the inertial position angle ϕx or ϕy. The lesser of the two calculated positional angles ϕx1, ϕx2 or ϕy1, ϕy2 has a higher likelihood of corresponding to the actual inertial angle ϕx or ϕy than the greater positional angle calculated, because the latter is probably due to an additive acceleration component that can be ascribed to a dynamic vehicle motion.

The inertial position angle ϕx or ϕy determined beforehand can preferably be used in function block 3 in rollover sensing. In rollover events, as a rule very rapid changes in position of the vehicle are occurring, which can be best detected by measuring the rotations rates ωx about the longitudinal axis x, ωy about the transverse axis y and ωz about the vertical axis z of the vehicle. From the measured rotation rates ωx, ωy and ωz, the positional angles αx, αy are then derived by integration, and on the basis of these positional angles, a decision is made whether the vehicle is threatening to overturn and restraint devices (such as air bags and safety belts) should therefore be tripped. So that in the integration of the measured rotation rates ωx, ωy, ωz dynamic vehicle motions that are not critical to a rollover event will not also be taken into account and the resultant positional angles αx, αy will not cause a mistake in deciding about a rollover event, it is expedient that the integration of the rotation rates be started with the ascertained inertial position angles ϕx, ϕy.

I claim:

1. A method for determining respective inertial position angles (ϕx,ϕy) of a vehicle, said method comprising the steps of:

a) measuring respective accelerations (ax, ay, az) of the vehicle (FZ) in a direction of a longitudinal axis (x) thereof, in a direction of a transverse axis (y) thereof and in a direction of a vertical axis (z) thereof; and b) calculating first position angle values (ϕx1,ϕx2) and second position angle values (ϕy1,ϕy2) from said respective measured accelerations assuming only gravity acts on said vehicle according to equations (1) and (2):

ϕx1=arcsin {ay/g}  ϕy1=arcsin {ax/g}   (1)

ϕx2=arccos{az/g}  ϕy2 =arccos{az/g}   (2)

wherein g is the acceleration of gravity; and c) setting the respective inertial position angles (ϕx,ϕy) equal to the smaller of the first position angle values (ϕx1,ϕx2) and of the second position angle values (ϕy1,ϕy2) calculated in step b).

2. A method of determining respective rotational position angles (αx,αy,αz) of a vehicle; said method comprising the steps of:

a) measuring respective accelerations (ax, ay, az) of the vehicle (FZ) in a direction of a longitudinal axis (x) thereof, in a direction of a transverse axis (y) thereof and in a direction of a vertical axis (z) thereof; and b) calculating first position angle values (ϕx1,ϕx2) and second position angle values (ϕy1,ϕy2) from said respective measured accelerations assuming only gravity acts on said vehicle according to equations (1) and (2):

ϕx1=arcsin {ay/g}  ϕy1=arcsin {ax/g}   (1)

ϕx2=arccos{az/g}  ϕy2=arccos{az/g}   (2)

wherein g is the acceleration of gravity; and c) determining respective inertial position angles (ϕx,ϕy) as the smaller of the first position angle values (ϕx1, ϕx2) and of the second position angle values (ϕy1, ϕy2) calculated in step b);

d) measuring corresponding rotation rates (ωx,ωy,ωz) of the vehicle; and e) determining said respective rotational position angles (αx,αy,αz) by integration of said corresponding rotation rates of said vehicle starting with said respective inertial position angles (ϕx,ϕy).

3. An arrangement for determining respective inertial position angles (ϕx,ϕy) of a vehicle, said arrangement comprising:

means for measuring respective accelerations (ax, ay, az) of the vehicle (FZ) in a direction of a longitudinal axis (x) thereof, in a direction of a transverse axis (y) thereof and in a direction of a vertical axis (z) thereof; and means for determining first position angle values (ϕx1, ϕx2) and second position angle values (ϕy1, ϕy2) from said respective measured accelerations assuming only gravity acts on said vehicle according to equations (1) and (2):

$$\phi x1 = \arcsin\{ay/g\} \quad \phi y1 = \arcsin\{ax/g\} \quad (1)$$

$$\phi x2 = \arccos\{az/g\} \quad \phi y2 = \arccos\{az/g\} \quad (2)$$

wherein g is the acceleration of gravity; and means for setting the respective inertial position angles ($\phi x, \phi y$) equal to the smaller of the first position angle values ($\phi x1, \phi x2$) and of the second position angle values ($\phi y1, \phi y2$).

4. An arrangement for determining respective rotational position angles ($\alpha x, \alpha y, \alpha z$) of a vehicle; said method comprising the steps of:

means for measuring respective accelerations (ax, ay, az) of the vehicle (FZ) in a direction of a longitudinal axis (x) thereof, in a direction of a transverse axis (y) thereof and in a direction of a vertical axis (z) thereof; and means for calculating first position angle values ($\phi x1, \phi x2$) and second position angle values ($\phi y1, \phi y2$) from said respective measured accelerations assuming only gravity acts on said vehicle according to equations (1) and (2):

$$\phi x1 = \arcsin\{ay/g\} \quad \phi y1 = \arcsin\{ax/g\} \quad (1)$$

$$\phi x2 = \arccos\{az/g\} \quad \phi y2 = \arccos\{az/g\} \quad (2)$$

wherein g is the acceleration of gravity; and means for determining respective inertial position angles ($\phi x, \phi y$) as the smaller of the first position angle values ($\phi x1, \phi x2$) and of the second position angle values ($\phi y1, \phi y2$);

means for measuring corresponding rotation rates ($\omega x, \omega y, \omega z$) of the vehicle; and means for determining said respective rotational position angles ($\alpha x, \alpha y, \alpha z$) by integration of said corresponding rotation rates of said vehicle starting with said respective inertial position angles ($\phi x, \phi y$).

* * * * *